United States Patent [19]

Hosoda et al.

[11] Patent Number: 4,586,335

[45] Date of Patent: May 6, 1986

[54] ACTUATOR

[75] Inventors: Yuji Hosoda, Ibaraki; Yoshio Kojima, Hitachi; Masakatsu Fujie; Kazuo Honma, both of Ibaraki; Taro Iwamoto, Mito; Yoshiyuki Nakano, Hitachi; Kohji Kamejima, Ibaraki, all of Japan

[73] Assignee: Hitachi, Ltd., Tokyo, Japan

[21] Appl. No.: 660,239

[22] Filed: Oct. 12, 1984

[30] Foreign Application Priority Data

Oct. 12, 1983 [JP] Japan ................. 58-189292

[51] Int. Cl.⁴ .............................. F03G 7/06
[52] U.S. Cl. ........................ 60/528; 60/527
[58] Field of Search ............ 60/527, 528, 529; 337/140

[56] References Cited

U.S. PATENT DOCUMENTS 4,197,709  4/1980  Hochstein ............... 60/527
4,490,975  1/1985  Yaeger et al. ........... 60/527

FOREIGN PATENT DOCUMENTS 45250  2/1982  European Pat. Off. ........... 60/528

Primary Examiner—Stephen F. Husar
Attorney, Agent, or Firm—Antonelli, Terry & Wands

[57] ABSTRACT

An actuator including a plurality of shape memory materials used as a drive source. The plurality of the shape memory materials being arranged in parallel between a stationary member and a movable member so as to enable the actuator to operate at high speed.

16 Claims, 7 Drawing Figures

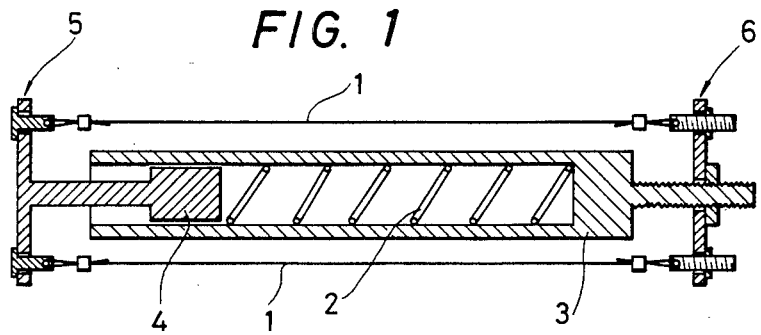
FIG. 1
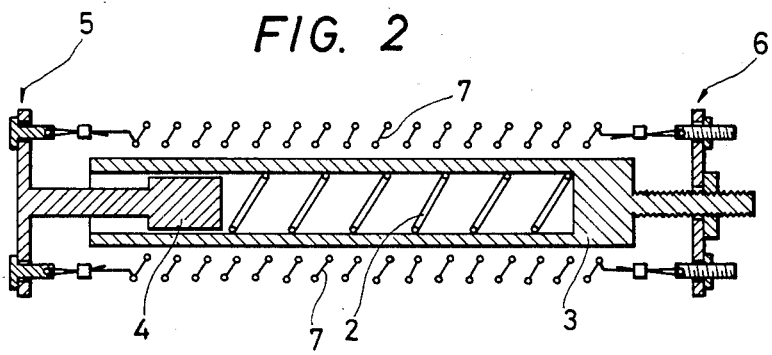
FIG. 2
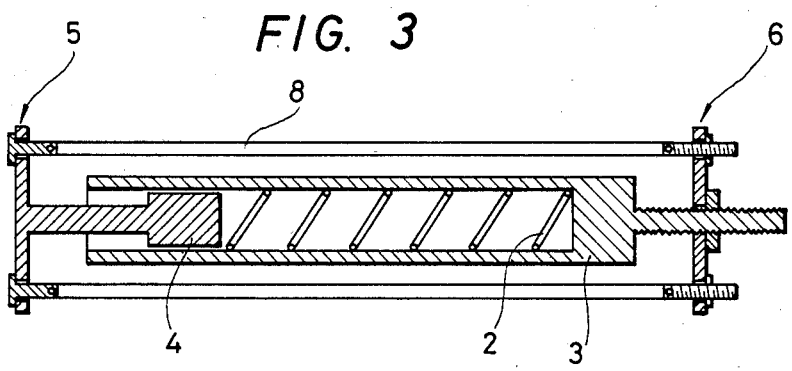
FIG. 3
FIG. 4
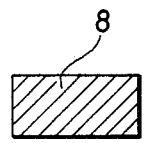

ACTUATOR

BACKGROUND OF THE INVENTION

The present invention relates to an actuator, and, more particularly, to an actuator for driving small, light weight mechanisms with several degrees of freedom, such as robot hands, manipulators, etc.

In, for example, British Pat. No. 1,554,738, one type of actuator for driving a load, in which a shape memory material is employed is disclosed, wherein the shape memory material is a coil spring and a further spring, arranged in alignment with the coil spring, imparts a deformation thereto are usually arranged in alignment, and a position is controlled by a balance between the reaction of the spring and the reaction of the shape memory material that changes with temperature. To construct a actuator which produces a large output, however, it is necessary to employ a shape memory material with a large wire diameter. This, however, results in a reduced heat-radiating performance of the shape memory material, and makes it difficult to increase the operating speed of the actuator in a cooling step.

SUMMARY OF THE INVENTION

The object of the present invention is to provide an actuator which enables a shape memory material to exhibit a good heat-radiating performance, so that it can operate at high speed.

In order to achieve this object, the present invention deals with an actuator in which a plurality of shape memory materials are arranged around the outer or inner periphery of a resilient member, such as a spring, which imparts a deformation to the shape memory materials, based upon the fact that heat-radiating performance and the operating speed increase if the surface area per unit volume of an actuator consisting of shape memory materials is increased.

Other objects, advantages and features of the invention will become obvious from the embodiments the following description when taken in connection with the accompanying drawings which show, for the purposes of illustration only, several embodiments in accordance with the present invention.

BRIEF DESCRIPTION OF THE DRAWINGS

FIG. 1 is a vertical cross-sectional view of one actuator according to an embodiment of the present invention; and FIGS. 2 to 7 are cross-sectional views of actuators constructed according to other embodiments of the present invention.

DETAILED DESCRIPTION

Figure 5:
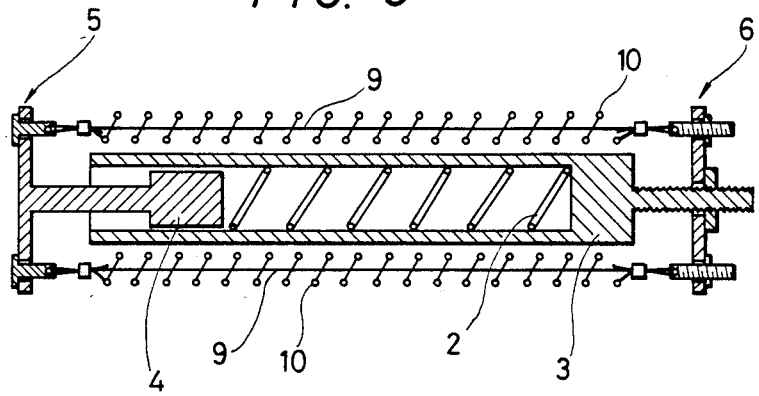

Referring now to the drawings wherein like reference numerals are used throughout the various views to designate like parts and, more particularly, to FIG. 1, according to this figure, an actuator includes a drive portion consisting of a plurality of linear shaped memory materials 1 of, for example, nickel, titanium or the like, arranged in parallel around a periphery of a guide 3, a resilient member 2 which imparts deformation to the shape memory materials 1, and a piston 4 which is slidably displaceable in accordance with the balance between the reaction of the shape memory materials 1 and the reaction of the resilient member 2. The plurality of the shape memory materials 1, arranged around the periphery of the guide 3, are disposed between the movable member generally designated by the reference numeral 5 at one end of a piston 4 and a stationary member generally designated by the reference numeral 6, so as to surround the resilient member 2. The rigidity of the shape memory materials 1 changes with the heat produced when an electric current is supplied from a power source (not shown) connected to end portions thereof.

With this structure, if the temperature of the shape memory materials 1 changes, the balance relative to the reaction of the resilient member 2 changes, and the position of the movable member 5 can be controlled.

According to the embodiment of FIG. 1, a large number of thin shape memory materials 1 can be employed, making it possible to construct an actuator which provides for a large output, a good heat-radiating performance, and high-speed operation.

As shown in FIG. 2, a drive portion of the actuator includes a plurality of shape memory materials 7 shaped as coil springs which are arranged in parallel. By virtue of this arrangement, the magnitude of the deformation can be increased, and an actuator having a good heat-radiating performance and a large stroke can be obtained.

In FIG. 3, the drive portion includes of shape memory materials 8 which, as shown in FIG. 4, have a rectangular cross-section, with a plurality of the shape memory materials 8 being arranged in parallel about the periphery of the guide 3. With this construction, the surface area of the shape memory materials 8 can be increased per unit volume, and the heat-radiating performance can be further increased.

As shown in FIG. 5, linear shape memory materials 9 are each arranged within a shape memory material 10 formed as a coil spring. With this arrangement, the density of the shape memory materials 9 can be increased to obtain a large output. Furthermore, the embodiment of FIG. 5, it is apparent that the shape memory materials 9 arranged within the coil spring shaped shape memory materials 10 may have any cross-sectional shape, such as, for example, a rectangular shape.

Figure 6:
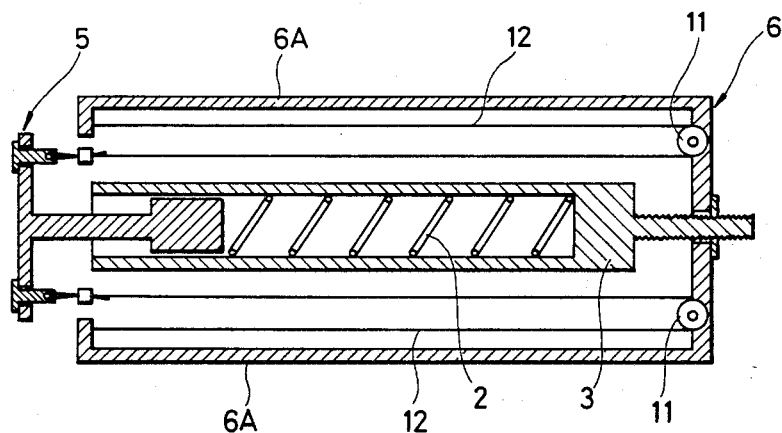

In the embodiment of FIG. 6, the stationary member 6 is provided with a holding member 6A, extending toward the movable member 5, pulleys 11 being provided on the inner side of the stationary member 6. One end of each of the shape memory materials 12 is connected to the movable member 5, and the other ends thereof are connected to the end of the holding member 6A, after passing over the corresponding pulleys 11. This construction produces a stroke which is twice that of the embodiment of FIG. 1. And, if the number of pulleys 11 is increased. the actuator produces a larger stroke.

Figure 7:
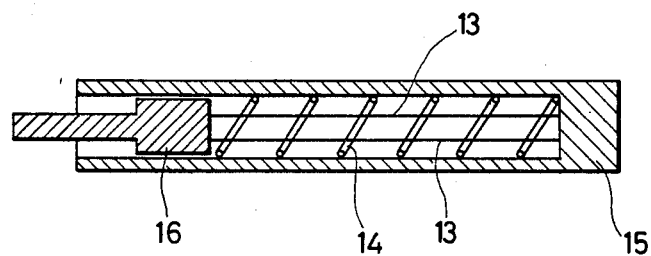

In the embodiment shown in FIG. 7, an actuator is provided which includes linear shaped memory materials 13, a resilient member 14, a guide 15, to which the resilient member 14 is attached, and a piston 16 which is slidably displaceable in accordance with the balance between the reaction of the shape memory materials 13 and the reaction of the resilient member 14. The embodiment of FIG. 7 provides a compact actuator which is not affected by changes in the temperature of the atmosphere.

According to the present invention, a plurality of shape memory materials are arranged in parallel, so that the surface area per unit volume of the shape memory materials is increased. Therefore it is possible to provide an actuator which features a good heat-radiating performance and high-speed operation.

What is claimed is:

1. An actuator comprising a drive source formed of a plurality of shape memory materials, a stationary member, a movable member forming an actuating portion of the actuator, mounted so as to be displacable relative to said stationary member, a resilient means arranged between said movable member and said stationary member for deforming a memorized shape of said shape memory materials, and wherein a plurality of shape memory materials are arranged in parallel between said movable member and said stationary member.

2. The actuator according to claim 1, wherein said shape memory materials are arranged within said resilient material, which is in a shape of a core, and extends in the longitudinal direction thereof.

3. The actuator according to claim 1, wherein said shape memory materials have a linear shape.

4. The actuator according to claim 1, wherein said shape memory materials have a coil shape.

5. The actuator according to claim 1, wherein said shape memory materials are arranged around an outer periphery of said resilient member and extend in a longitudinal direction thereof.

6. The actuator according to claim 5, wherein said shape memory materials have a linear shape.

7. The actuator according to claim 5, wherein said shape memory materials have a coil shape.

8. The actuator according to claim 1, wherein said shape memory materials are arranged within said resilient material and extend in the longitudinal direction thereof, and wherein the resilient means are coil-shaped.

9. The actuator according to claim 8, wherein a plurality of shape memory materials are arranged within said resilient materials.

10. The actuator according to claim 5, wherein said stationary member is provided with a holding member extending substantially as far as said movable member, pulleys are mounted on an inner side of said stationary member, one end of each of said shape memory materials is connected to said movable member, and the other end of said shape memory materials is connected to an extended end of said holding member after passing over one of said pulleys.

11. The actuator according to claim 10, wherein said shape memory materials have a linear shape.

12. An actuator comprising a drive source formed of a plurality of shape memory materials, a stationary member, a movable member mounted so as to be displacable relative to said stationary member, a resilient means arranged between said movable member and said stationary member for imparting a deformation to the shape memory materials, the plurality of shape memory materials are arranged in parallel between said movable member and said stationary member and wherein said shape memory materials are arranged around an outer periphery said resilient member and extend in a longitudinal direction thereof.

13. The actuator according to claim 12, wherein said stationary member is provided with a holding member extending substantially as far as said movable member, pulleys are mounted on an inner side of said stationary member, one end of each of said shape memory materials is connected to said movable member, and the other end of each of said shape memory materials is connected to an extended end of said holding member after passing over one of said pulleys.

14. The actuator according to claim 13, wherein said shape memory materials have a linear shape.

15. The actuator according to claim 12, wherein said shape memory materials have a linear shape.

16. The actuator according to claim 12, wherein said shape memory materials have a coil shape.

* * * * *